US010699217B2

(12) United States Patent
Rana et al.

(10) Patent No.: US 10,699,217 B2
(45) Date of Patent: Jun. 30, 2020

(54) METHOD AND SYSTEM FOR REFLECTIVE LEARNING

(71) Applicant: Diwo, LLC, Northville, MI (US)

(72) Inventors: Satyendra Pal Rana, Northville, MI (US); Chandra Puttanna Keerthy, Northville, MI (US); Krishna Prakash Kallakuri, Northville, MI (US)

(73) Assignee: DIWO, LLC, Northville, MI (US)

( * ) Notice: Subject to any disclaimer, the term of this patent is extended or adjusted under 35 U.S.C. 154(b) by 166 days.

(21) Appl. No.: 15/788,385

(22) Filed: Oct. 19, 2017

(65) Prior Publication Data

US 2018/0114164 A1    Apr. 26, 2018

Related U.S. Application Data

(60) Provisional application No. 62/410,644, filed on Oct. 20, 2016.

(51) Int. Cl.
| | | |
|---|---|---|
| *G06N 20/00* | (2019.01) | |
| *G06Q 10/06* | (2012.01) | |
| *H04L 29/06* | (2006.01) | |
| *G06F 16/903* | (2019.01) | |
| *G06N 5/04* | (2006.01) | |
| *G06N 3/08* | (2006.01) | |
| *G06N 7/00* | (2006.01) | |
| *G06N 5/02* | (2006.01) | |

(52) U.S. Cl.
CPC .......... *G06N 20/00* (2019.01); *G06F 16/903* (2019.01); *G06N 3/08* (2013.01); *G06N 5/022* (2013.01); *G06N 5/04* (2013.01); *G06N 7/005* (2013.01); *G06Q 10/0637* (2013.01); *H04L 63/1408* (2013.01)

(58) Field of Classification Search
None
See application file for complete search history.

(56) References Cited

U.S. PATENT DOCUMENTS

6,101,489 A * 8/2000 Lannert ............ G06Q 10/06393
706/45
6,199,068 B1 * 3/2001 Carpenter .............. G01D 4/004
(Continued)

*Primary Examiner* — Gurkanwaljit Singh
(74) *Attorney, Agent, or Firm* — FisherBroyles, LLP; Susan M. Oiler (57) ABSTRACT

The present disclosure relates to system(s) and method(s) for reflective learning in a cognitive decision-making process. In one embodiment, the method comprises receiving input data and computing a first deviation in user behavior based on input data. The method further comprises classifying the business opportunities and the strategies as one of an accurate business opportunities or an inaccurate business opportunities and an accurate strategies or an inaccurate strategies based on comparison of the first deviation with a predefined threshold and identifying one or more algorithm and metadata associated with the inaccurate business opportunities and the inaccurate strategies. The method furthermore comprises executing one of a retraining of the one or more algorithm, a modifying the metadata associated with the inaccurate business opportunities and the inaccurate strategies or generating a new algorithm thereby enabling reflective learning in a cognitive decision-making process.

9 Claims, 3 Drawing Sheets

(56) References Cited

U.S. PATENT DOCUMENTS

| | | | |
|---|---|---|---|
| 6,876,991 B1* | 4/2005 | Owen | G06N 20/00 706/46 |
| 6,877,153 B2* | 4/2005 | Konnersman | G06Q 10/10 717/100 |
| 6,901,393 B1* | 5/2005 | Owen | G06Q 10/063 706/46 |
| 6,980,983 B2* | 12/2005 | Banerjee | G06Q 10/00 |
| 7,177,851 B2* | 2/2007 | Afeyan | G06F 17/50 706/13 |
| 7,296,023 B2* | 11/2007 | Geyer | G06Q 10/10 |
| 7,363,342 B1* | 4/2008 | Wang | H04L 67/02 709/204 |
| 7,412,482 B2* | 8/2008 | Ludwig | G06Q 10/10 709/204 |
| 8,214,238 B1* | 7/2012 | Fairfield | G06Q 10/063 705/7.11 |
| 8,533,222 B2 | 9/2013 | Breckenridge et al. | |
| 8,533,224 B2 | 9/2013 | Lin et al. | |
| 2003/0033302 A1* | 2/2003 | Banerjee | G06Q 10/00 |
| 2003/0069870 A1* | 4/2003 | Ras | G06Q 10/10 706/54 |
| 2003/0074264 A1* | 4/2003 | Hoffman | G06Q 10/06 705/7.36 |
| 2003/0078900 A1* | 4/2003 | Dool | G06F 3/0481 706/18 |
| 2003/0182177 A1* | 9/2003 | Gallagher | G06Q 10/0631 705/7.12 |
| 2003/0217105 A1* | 11/2003 | Zircher | G06Q 10/10 709/205 |
| 2004/0049345 A1* | 3/2004 | McDonough | G06Q 10/10 702/12 |
| 2004/0117358 A1* | 6/2004 | von Kaenel | G06Q 40/08 |
| 2004/0138932 A1* | 7/2004 | Johnson | G06Q 10/0637 705/7.36 |
| 2004/0138934 A1* | 7/2004 | Johnson | G06Q 10/06 705/7.36 |
| 2004/0143603 A1* | 7/2004 | Kaufmann | G09B 5/08 |
| 2004/0143630 A1* | 7/2004 | Kaufmann | G06F 16/40 709/205 |
| 2004/0153504 A1* | 8/2004 | Hutchinson | G06Q 10/10 709/204 |
| 2004/0186750 A1* | 9/2004 | Surbey | G06Q 10/10 705/4 |
| 2005/0038764 A1* | 2/2005 | Minsky | G06Q 10/06 706/47 |
| 2005/0165859 A1* | 7/2005 | Geyer | G06Q 10/10 |
| 2005/0240568 A1* | 10/2005 | Banerjee | G06Q 10/00 |
| 2006/0106637 A1* | 5/2006 | Johnson | G06Q 10/10 705/7.11 |
| 2007/0027919 A1* | 2/2007 | Mastel | G06Q 30/06 |
| 2007/0150330 A1* | 6/2007 | McGoveran | G06Q 10/06 705/7.13 |
| 2008/0015871 A1* | 1/2008 | Eder | G06Q 10/067 706/21 |
| 2009/0018891 A1* | 1/2009 | Eder | G06Q 10/06 705/7.28 |
| 2009/0287737 A1* | 11/2009 | Hammerly | G06F 16/288 |
| 2010/0070753 A1* | 3/2010 | Kido | G06Q 10/06 713/150 |
| 2010/0223211 A1* | 9/2010 | Johnson | G06Q 10/00 706/11 |
| 2014/0058794 A1* | 2/2014 | Malov | G06Q 10/083 705/7.31 |
| 2016/0358098 A1 | 12/2016 | Duesterwald et al. | |

* cited by examiner

METHOD AND SYSTEM FOR REFLECTIVE LEARNING

CROSS REFERENCE TO RELATED APPLICATIONS

This patent application claims priority from U.S. Provisional Application No. 62/410,644 filed on Oct. 20, 2016, the entirety of which is hereby incorporated by reference.

TECHNICAL FIELD

The present disclosure in general relates to the field of cognitive computing. More particularly, the present subject matter relates to a system and a method for reflective learning in a cognitive decision-making process.

BACKGROUND

Generally, machine learning may be understood as a method of data analysis that learns a model from historical data, which can then be applied to extract implicit knowledge from future data. In the context of opportunity based cognitive decision-making process and system, machine-learning method by itself alone is inadequate because of continuous man-machine interactions and dynamic changes in the decision-making environment. Furthermore, the conventional machine learning systems and methods lack the ability to reflect upon the contextual decision-making process and to take into account numerous model interdependencies that may degrade the performance of learned models in an unpredictable manner.

SUMMARY

Before the present a system and a method for reflective learning in a cognitive decision-making process, are described, it is to be understood that this application is not limited to the particular systems, and methodologies described, as there can be multiple possible embodiments, which are not expressly illustrated in the present disclosures. It is also to be understood that the terminology used in the description is for the purpose of describing the particular implementations, versions, or embodiments only, and is not intended to limit the scope of the present application. This summary is provided to introduce aspects related to a system and a method for reflective learning in a cognitive decision-making process. This summary is not intended to identify essential features of the claimed subject matter nor is it intended for use in determining or limiting the scope of the claimed subject matter.

In one embodiment, a method for reflective learning in a cognitive decision-making process is disclosed. In the embodiment, the method comprises the step of receiving input data. In one example, the input data may comprise one or more of a user input, and a system input. In one other example, the input data may be associated with one or more of business opportunities from a set of business opportunities, and strategies associated with the business opportunities. In another example, the user input may comprise one or more of an acceptance of the business opportunity, a rejection of the business opportunity, an amendment of the business opportunity, and no response on the business opportunity, an acceptance of the strategy, a rejection of the strategy, an amendment of the strategy, and no response on the strategy, and the system data may comprise computing load, activities logs and failure characteristics, metadata associated with the business opportunity. In an example, the metadata may comprise one or more symptoms used for identifying the business opportunity, a reason for identifying the business opportunity, data associated with process within the organization. Upon receiving, the method may comprise the step of computing a first deviation in user behaviour based on input and classifying the business opportunities and the strategies as one of accurate business opportunities or inaccurate business opportunities and accurate strategies or inaccurate strategies based on comparison of the first deviation with a predefined threshold. In one example, the identification may be based on comparison of the user input indicative of user behaviour and an expected user behaviour. Further to classifying, the method may comprise the step of identifying one or more algorithm and metadata associated with the inaccurate business opportunities and the inaccurate strategies and executing one of a retraining of the one or more algorithm, a modifying the metadata associated with the inaccurate business opportunities and the inaccurate strategies or generating a new algorithm thereby enabling reflective learning in a cognitive decision-making process. In one example, the retraining may be one of automatic or semi-automatic, or manual.

In another embodiment, a system for reflective learning in a cognitive decision-making process is disclosed. The system comprises a memory and a processor coupled to the memory, further the processor may be configured to execute programmed instructions stored in the memory. In one embodiment, the system may receive input data. In one example, the input data may comprise one or more of a user input, and a system input. In one other example, the input data may be associated with one or more of business opportunities from a set of business opportunities, and strategies associated with the business opportunities. In another example, the user input may comprise one or more of an acceptance of the business opportunity, a rejection of the business opportunity, an amendment of the business opportunity, and no response on the business opportunity, an acceptance of the strategy, a rejection of the strategy, an amendment of the strategy, and no response on the strategy, and the system data may comprise computing load, activities logs and failure characteristics, metadata associated with the business opportunity. In an example, the metadata may comprise one or more symptoms used for identifying the business opportunity, a reason for identifying the business opportunity, data associated with process within the organization. Upon receiving the system may compute a first deviation in user behaviour based on input. In one example, the identification may be based on comparison of the user input indicative of user behaviour and an expected user behaviour. Subsequent to computing, the system may classify the business opportunities and the strategies as one of accurate business opportunities or inaccurate business opportunities and accurate strategies or inaccurate strategies based on comparison of the first deviation with a predefined threshold. Further to classifying the system may identify one or more algorithm and metadata associated with the inaccurate business opportunities and the inaccurate strategies and execute one of a retraining of the one or more algorithm, a modifying the metadata associated with the inaccurate business opportunities and the inaccurate strategies or generating a new algorithm thereby enabling reflective learning in a cognitive decision making process, wherein the retraining is one of automatic or semi-automatic, or manual.

In yet another implementation, non-transitory computer readable medium embodying a program executable in a computing device for reflective learning in a cognitive decision-making is disclosed. The program may comprise a program code for receiving input data. In one example, the input data may comprise one or more of a user input, and a system input. In one other example, the input data may be associated with one or more of business opportunities from a set of business opportunities, and strategies associated with the business opportunities. In another example, the user input may comprise one or more of an acceptance of the business opportunity, a rejection of the business opportunity, an amendment of the business opportunity, and no response on the business opportunity, an acceptance of the strategy, a rejection of the strategy, an amendment of the strategy, and no response on the strategy, and the system data may comprise computing load, activities logs and failure characteristics, metadata associated with the business opportunity. In an example, the metadata may comprise one or more symptoms used for identifying the business opportunity, a reason for identifying the business opportunity, data associated with process within the organization. The program may comprise a program code for computing a first deviation in user behaviour based on input. In one example, the identification may be based on comparison of the user input indicative of user behaviour and an expected user behaviour. The program may comprise a program code for classifying the business opportunities and the strategies as one of accurate business opportunities or inaccurate business opportunities and accurate strategies or inaccurate strategies based on comparison of the first deviation with a predefined threshold. The program may comprise a program code for identifying one or more algorithm and metadata associated with the inaccurate business opportunities and the inaccurate strategies. The program may comprise a program code for executing one of a retraining of the one or more algorithm, a modifying the metadata associated with the inaccurate business opportunities and the inaccurate strategies or generating a new algorithm thereby enabling reflective learning in a cognitive decision-making process.

BRIEF DESCRIPTION OF THE DRAWINGS

The foregoing detailed description of embodiments is better understood when read in conjunction with the appended drawings. For the purpose of illustrating of the present subject matter, an example of construction of the present subject matter is provided as figures. However, the present subject matter is not limited to the specific a system and a method for reflective learning in a cognitive decision-making process, disclosed in the document and the figures.

The present subject matter is described detail with reference to the accompanying figures. In the figures, the left-most digit(s) of a reference number identifies the figure in which the reference number first appears. The same numbers are used throughout the drawings to refer various features of the present subject matter.

The figures depict an embodiment of the present disclosure for purposes of illustration only. One skilled in the art will readily recognize from the following discussion that alternative embodiments of the system and methods for reflective learning in a cognitive decision-making process illustrated herein may be employed without departing from the principles of the disclosure described herein.

DETAILED DESCRIPTION

Some embodiments of this disclosure, illustrating all its features, will now be discussed in detail. The words "comprising," "having," "containing," and "including," and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any a system and a method for reflective learning in a cognitive decision making process, similar or equivalent to those described herein can be used in the practice or testing of embodiments of the present disclosure, the exemplary, a system and a method for reflective learning in a cognitive decision making process are now described.

Various modifications to the embodiment will be readily apparent to those skilled in the art and the generic principles herein may be applied to other embodiments to synthesis a business opportunity identified from a set of business opportunities corresponding to an organization for a cognitive decision-making process. However, one of ordinary skill in the art will readily recognize that the present disclosure for reflective learning in a cognitive decision-making process is not intended to be limited to the embodiments described, but is to be accorded the widest scope consistent with the principles and features described herein.

In the present disclosure, a business opportunity may be understood as a transient circumstance that comes along the way of a business operation and which needs to be handled strategically in order to promote the business. In other words, the business opportunity may be understood as an opportunity for an organization to gain a profit, reduce a loss, or maintain its hold in the market. Though organization identify these business opportunities, however identifying these business opportunities in real time or even predicting the business opportunities is the key to success. It may be noted that the system may identify a business opportunity for which a strategy may be implemented. However, the strategy needs to be implemented on time by a decision maker so as to achieve the designated goal. Therefore, it becomes further important to provide a rationale, an impact and act by date along with the description of the business opportunity for the generating a strategy in a cognitive decision-making process. Further upon identifying of the business opportunity and the strategy needs to be accurate in order to reduce time and effort wastage due to implementation in accurate strategies or for inaccurate business opportunities.

In one embodiment, to achieve the above and other advantages, the system and a method for reflective learning in a cognitive decision-making process is disclosed. In the embodiment, input data received. In one example, the input data may comprise one or more of a user input, and a system input. In one other example, the input data may be associated with one or more of business opportunities from a set of business opportunities, and strategies associated with the business opportunities. In another example, the user input may comprise one or more of an acceptance of the business opportunity, a rejection of the business opportunity, an amendment of the business opportunity, and no response on the business opportunity, an acceptance of the strategy, a rejection of the strategy, an amendment of the strategy, and no response on the strategy, and the system data may comprise computing load, activities logs and failure characteristics, metadata associated with the business opportunity. In an example, the metadata may comprise one or more symptoms used for identifying the business opportunity, a reason for identifying the business opportunity, data associated with process within the organization.

Upon receiving, a first deviation in user behaviour may be computed based on input. In one example, the identification may be based on comparison of the user input indicative of user behaviour and an expected user behaviour. Subsequent to computing, the business opportunities and the strategies may be classified as one of an accurate business opportunities or inaccurate business opportunities and accurate strategies or inaccurate strategies based on comparison of the first deviation with a predefined threshold.

Further to classifying, one or more algorithm and metadata associated with the inaccurate business opportunities and the inaccurate strategies may be identified. Upon identifying one of a retraining of the one or more algorithm, a modifying the metadata associated with the inaccurate business opportunities and the inaccurate strategies or generating a new algorithm may be executed, thereby enabling reflective learning in a cognitive decision-making process.

Figure 1:
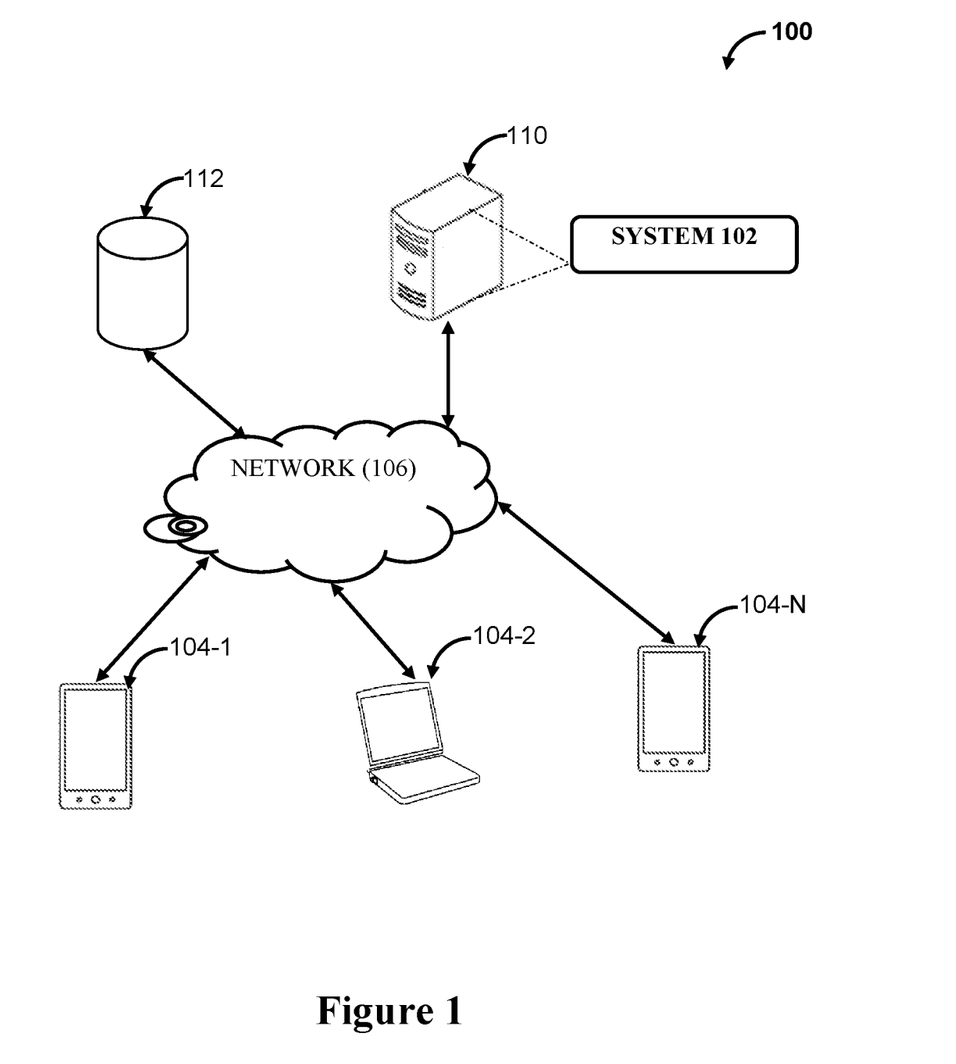
FIG. 1 illustrates an embodiment of a network implementation of a system for reflective learning in a cognitive decision-making process, in accordance with an embodiment of the present subject matter.

Referring now to FIG. 1, a network implementation 100 of a system 102 for reflective learning in a cognitive decision-making process is disclosed. It may be understood that the present disclosure is explained considering that the system 102 is implemented on a server 110. But it may be understood the system may be implemented on variety of computing systems, such as a mobile communication device (such as a smartphone), a laptop computer, a desktop computer, a notebook, a workstation, a mainframe computer, a server, a network server, and the like. It will be understood that multiple users may access the system 102 through one or more user devices 104-1, 104-2 . . . 104-N, herein after individually and jointly referred to as user device(s) 104. Examples of the user devices 104 may include, but are not limited to, a portable computer, a personal digital assistant, a handheld device, and a workstation. The user devices 104 are communicatively coupled to the system 102 through a network 106. Further, the system 102 may be communicatively coupled to knowledge database 112 through the network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may be either a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

Figure 2:
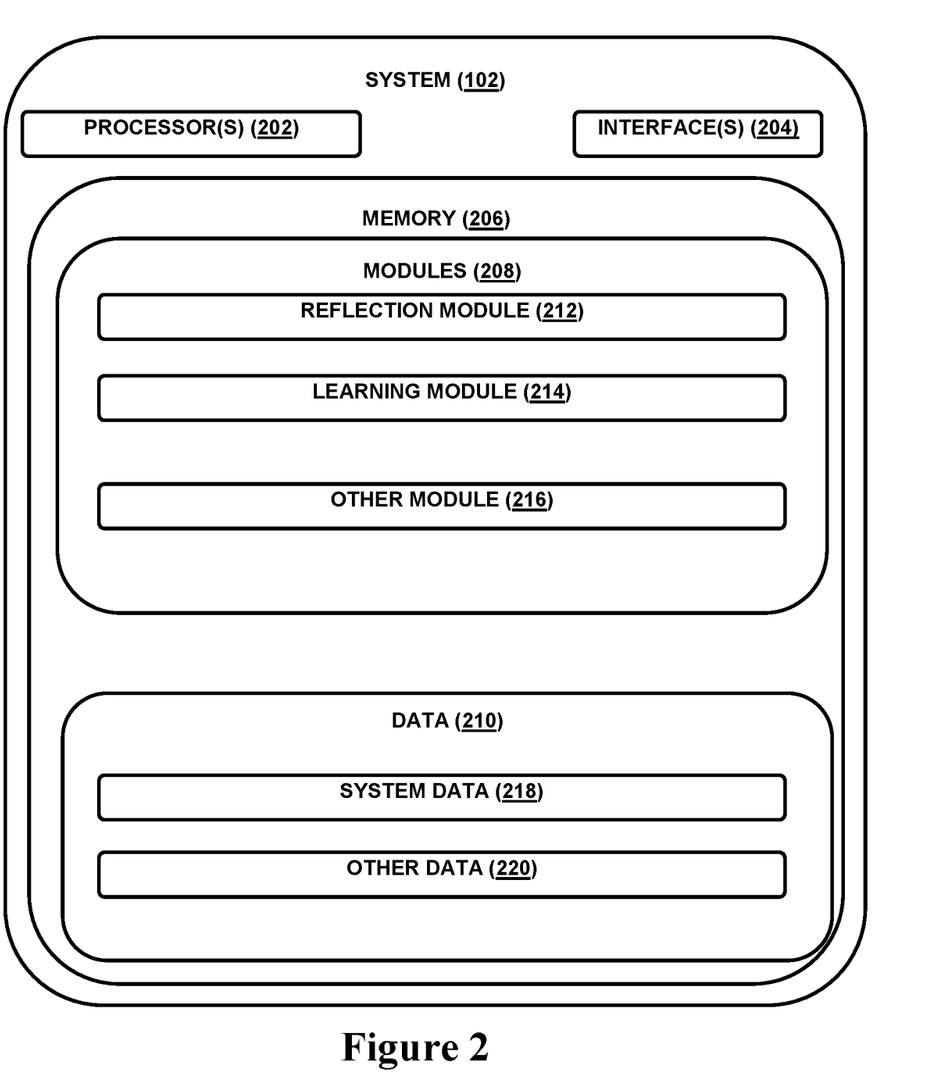
FIG. 2 illustrates the system for reflective learning in a cognitive decision-making process, in accordance with an embodiment of the present subject matter.

Referring now to FIG. 2, the system 102 for reflective learning in a cognitive decision-making process is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random-access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a reflection module 212, a learning module 214 and other modules 216. The other modules 216 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. Further, the data may include system data 218, and other data 220. The other data 220 may include data generated because of the execution of one or more modules in the other modules 216.

In one implementation, the system 102 addresses the challenges observed in the existing art. More specifically, the system 102 facilitates systems approach to reflective learning in a cognitive decision-making process. A systems approach entails analysis of problems and synthesis of solutions. Initially the system 102 receives a business opportunity identified from a set of business opportunities corresponding to an organization for a cognitive decision-making process. Examples of business opportunity may be "Preventing Churn of Customers Opportunity" "Excess Stock Prevention Opportunity" in shopping mall. In one aspect, the excess stock has a cost associated with it and thus, preventing it will cause a net saving. In other aspect, preventing churn of customer has a loss of revenue over the life span of the customer associated with it. Thus, upon identifying the business opportunity along with its reason is critical so that a user may take further action.

In the embodiment, prior to identifying the business opportunity the system 102 may receive a set of business opportunities from a user within an organization and generate one or more symptoms associated with the one or more business opportunities from the set of business opportunities based on a predefined threshold. In one example, the symptoms may comprise patterns and instructions for collecting data corresponding to the pattern. In one example, multiple business opportunity may be mapped to a single symptom and vices versa.

Referring to the business opportunity of customer churn prevention. In the example, the system 102 upon receiving the costumer churn prevention opportunity may generate symptoms comprising patterns such as "customers not buying from last 5 day" "customers reducing total amount of spend over last 3 transaction". The duration of "last 5 day" and "last 3 transactions" may be predefined or may be obtained from the user or the general knowledge. Further, the symptoms may comprise instructions to collect database on the symptoms.

Initially, the system 102 may identify a business opportunity based on analysis of the set of data using the one or more symptoms and generate a reason associated with the identification of the business opportunity. Further, to identifying and receiving the one or more business opportunities and one or more strategies a user may be prompted to provide his inputs. Further, the reflection module 212 may receive input data. In one example, the input data may comprise one or more of a user input, and a system input. In one other example, the input data may be associated with one or more of business opportunities from a set of business opportunities, and strategies associated with the business opportunities. In another example, the user input may comprise one or more of an acceptance of the business opportunity, a rejection of the business opportunity, an amendment of the business opportunity, and no response on the business opportunity, an acceptance of the strategy, a rejection of the strategy, an amendment of the strategy, and no response on the strategy, and the system data may comprise computing load, activities logs and failure characteristics, metadata associated with the business opportunity. In an example, the metadata may comprise one or more symptoms used for identifying the business opportunity, a reason for identifying the business opportunity, data associated with process within the organization.

Upon receiving, the reflection module 212 may generate an expected behaviour of the user based on historical data and an expectation threshold and ideal system data indicative of an idea system behaviour, wherein the historical data comprises at least the activity log.

Upon generating an expected behaviour, the reflection module 212 may compute a first deviation in user behaviour based on input. In one example, the computation is based on comparison of the user input indicative of user behaviour and an expected user behaviour. Upon computing the first deviation, the system may compute a second deviation based on analysis of system input, and an ideal system data indicative of ideal working of the system Further, the reflection module 212 may classify the business opportunities and the strategies as one of accurate business opportunities or inaccurate business opportunities and accurate strategies or inaccurate strategies based on comparison of the first deviation with a predefined threshold or the second deviation with a predefined threshold. Subsequent to classifying, the learning module 214 identifying one or more algorithm and metadata associated with the inaccurate business opportunities and the inaccurate strategies. Further to identifying, the learning module 214 may execute one of a retraining of the one or more algorithm, a modifying the metadata associated with the inaccurate business opportunities and the inaccurate strategies or generating a new algorithm thereby enabling reflective learning in a cognitive decision-making process. In one example, the retraining is one of automatic or semi-automatic, or manual.

Referring back to the example, of "preventing customer churning" business opportunity comprising a list of 100 customers that may churn. Further, to identifying and receiving "preventing customer churning" business opportunities and one or more strategies a user may be prompted to provide his inputs. Further, the reflection module 212 may receive input data. In one example, the input data may comprise one or more of a user input, and a system input. The user input may comprise one or more of an acceptance of 60 customers in the customer list, a rejection of the business opportunity 20 customer in the customer list, an amendment of the business opportunity in 10 customer from the customer list, and no response on the business opportunity 10 customers, an acceptance of the strategy, a rejection of the strategy, an amendment of the strategy, and no response on the strategy, and the system data may comprise computing load, activities logs and failure characteristics, generated during the identification of "preventing customer churning" business opportunity. In an example, the metadata may comprise one or more symptoms used for identifying the business opportunity, a reason for identifying the business opportunity, data associated with process within the organization.

Upon receiving, the reflection module 212 may generate an expected behaviour of the user, for example, the user should have accepted 80 customers from the customers list based on historical data and an expectation threshold and ideal system data, for example the computing time should be 10 hours indicative of an idea system behaviour, wherein the historical data comprises at least the activity log.

Upon generating an expected behaviour, the reflection module 212 may compute a first deviation, for example, equal to 25% in user behaviour based on user input. In one example, the computation is based on comparison of the user input i.e. 60 customers accepted indicative of user behaviour and an expected user behaviour i.e. 80. Upon computing the first deviation, the system may compute a second deviation, for example, 10% based on analysis of system input for example 11 hours computation time, and an ideal system data, 10 hours of computation time.

Further, the reflection module 212 may classify the business opportunities and the strategies as one of accurate business opportunities or inaccurate business opportunities and accurate strategies or inaccurate strategies based on comparison of the first deviation i.e. 25% with a predefined threshold such as 10%, or the second deviation i.e. 10% with a predefined threshold, such as 10%. In one example, the deviation greater that predefined threshold is classified as inaccurate. Subsequent to classifying, the learning module 214 identifying one or more algorithm and metadata associated with the inaccurate business opportunities and the inaccurate strategies. Further to identifying, the learning module 214 may execute one of a retraining of the one or more algorithm, a modifying the metadata associated with the inaccurate business opportunities and the inaccurate strategies or generating a new algorithm thereby enabling reflective learning in a cognitive decision-making process. In one example, the retraining is one of automatic or semi-automatic, or manual.

In one more implementation, system 102 is responsible for reflective learning in ODS (opportunity detection system of a cognitive decision-making process, not shown), and the subsequent description illustrates the message flow between internal and external to the system 102. Reflective Learning happens in both automatic and human-assisted ways. Reflective learning may be understood as the ability to reflect on an action to engage in a process of continuous learning. In the system 102, the algorithm is continuously evaluated for their accuracy and re-developed if necessary either automatically or semi-automatically. Typically, an existing algorithm may degrade over time (becomes less accurate), if there is a shift in the nature of processes generating the input data. If the accuracy drops below an acceptable threshold, the algorithm is marked up for redevelopment.

In the implementation, system 102 uses two modules reflection module 212 and learning module 214. In one example, reflection module 212 may be responsible for continuous evaluation of existing models. Further, in the example, learning module 214 may be responsible for learning by re-computing models or introducing new models. Further Table 1 illustrates one example of the top level message types used by system 102

TABLE 1 top-level message types
Message Types used by System 102

| # | Message Type | Producer Module | Consumer Module | Description |
|---|---|---|---|---|
| 1 | Learning-Start (Learning Start) | Action Guidance Module | System 102 | This message is triggered for each opportunity instance after it has gone through SENSE, EXPLORE, and ACT phases of the SEAL process. |
| 2 | O-R-Start (Opportunity Reflection Start) | System 102 | Reflection Module | This message triggers reflective analysis for the current opportunity type |
| 3 | O-R-Done (Opportunity Reflection Done) | Reflection Module | System 102 | This message is emitted after completion of current reflective learning iteration. |
| 4 | O-L-Start (Opportunity Learning Start) | System 102 | Learning Module | This message triggers learning activity pertaining to the current opportunity type. |
| 5 | O-L-Done (Opportunity Learning Done) | Learning Module | System 102 | This message is emitted after completion of learning activity for the current opportunity type. |
| 6 | Learning-Done | System 102 | Knowledge Module | This message triggers the update of knowledge because of learning in the Reflective Learning Module. |

In the implementation, system 102 for reflective learning function in multiple phases such as initiation phase, execution phase termination phase. In one example, below description explains an overview of the behavior of the system 102.

In one example in the initialization phase, upon start the system performs the following initialization activities:
/* Set Up Connections to External Message Queues */
1. Register as CONSUMER to the following message queues:
   a) Learning-Start messages queue
   b) From-H-To-R message queue
   c) From-K-To-R message queue
2. Register as PRODUCER to the following message queues:
   a) Learning-Done message queue
   b) From-R-To-H message queue
   c) From-R-To-K message queue
/* Set Up Message Queues for Communication with Reflection Module 212 and Learning Module 214 */

3. Create the following message queues and register as PRODUCER:
   a) O-R-Start message queue
   b) O-L-Start message queue
4. Create the following queues and register as CONSUMER:
   a) O-R-Done message queue
   b) O-L-Done message queue
/* Start Internal Component Modules */
5. Start following modules, passing them the reference to OTS-KO (The Opportunity Types Knowledge Object, alternatively referred to as business opportunity):
   a) Reflection Module 212
   b) Learning Module 214

In one example in the execution phase, after completing initialization and starting, system 102 may execute the following activities concurrently:
/* Listen to Normal Messages */
1. Upon receiving Learning-Start message, perform the following:
   a. Let 'op-type' be the opportunity type associated with the Opportunity Instance Knowledge Object, OI-KO.
   b. If 'online learning' is applicable for this 'op-type', then
      i. Create a new message of O-L-Start message type
      ii. Include the reference to OI-KO in the new message
      iii. Append the new message to O-L-Start message queue
   c. If 'reflective analysis' is applicable for this 'op-type', then
      i. Create a new message of O-R-Start message type
      ii. Include the reference to OI-KO in the new message
      iii. Append the new message to O-R-Start message queue
2. Upon receiving an O-R-Done (opportunity reflection done) message from Reflection Module 212, perform the following:

a. // if status is new model then
   i. Create a new message of O-L-Start message type
   ii. Include the reference to model object in the new message
   iii. Append the new message to O-L-Start message queue
3. Upon receiving an O-L-Done (opportunity learning done) message from Learning Module 214,
   a. If there is a change, them
      i. Create a new message of Learning-Done message type
      ii. Include the reference to model object in the new message
      iii. Append the new message to Learning-Done message queue.

/* Listen to Exception/Error Messages from Component Modules 212, and 214 */
4. Upon receiving an exception message from reflection module 212, or learning module 214, perform the following:
   a. If exception cannot be handled at system 102 level, invoke exception-handling mechanism of the system 102. This may involve stopping and restarting reflection module 212, or learning module 214
   b. Save error and recovery logs using logging service.

/* Listen to Requests from Human Interaction Module */
5. Knowledge Manager user can interact with System 102 to:
   a. View the status of Reflective Learning Module
   b. View errors and logs
   c. Stop and restart Reflection Module 212
   d. Stop and restart Learning Module 214

Exemplary embodiments for reflective learning in a cognitive decision-making process discussed above may provide certain advantages. Though not required to practice aspects of the disclosure, these advantages may include those provided by the following features.

Some embodiments of the system and the method enable maintenance of algorithm and metadata used in the process of cognitive decision-making.

Some embodiments of the system and the method enable improving in timelines due to faster processing.

Some embodiments of the system and the method reduce losses inaccurate identification of business opportunities and implementation of strategies to profit from the business opportunity.

Some embodiments of the system and the method enables increases accuracy.

Figure 3:
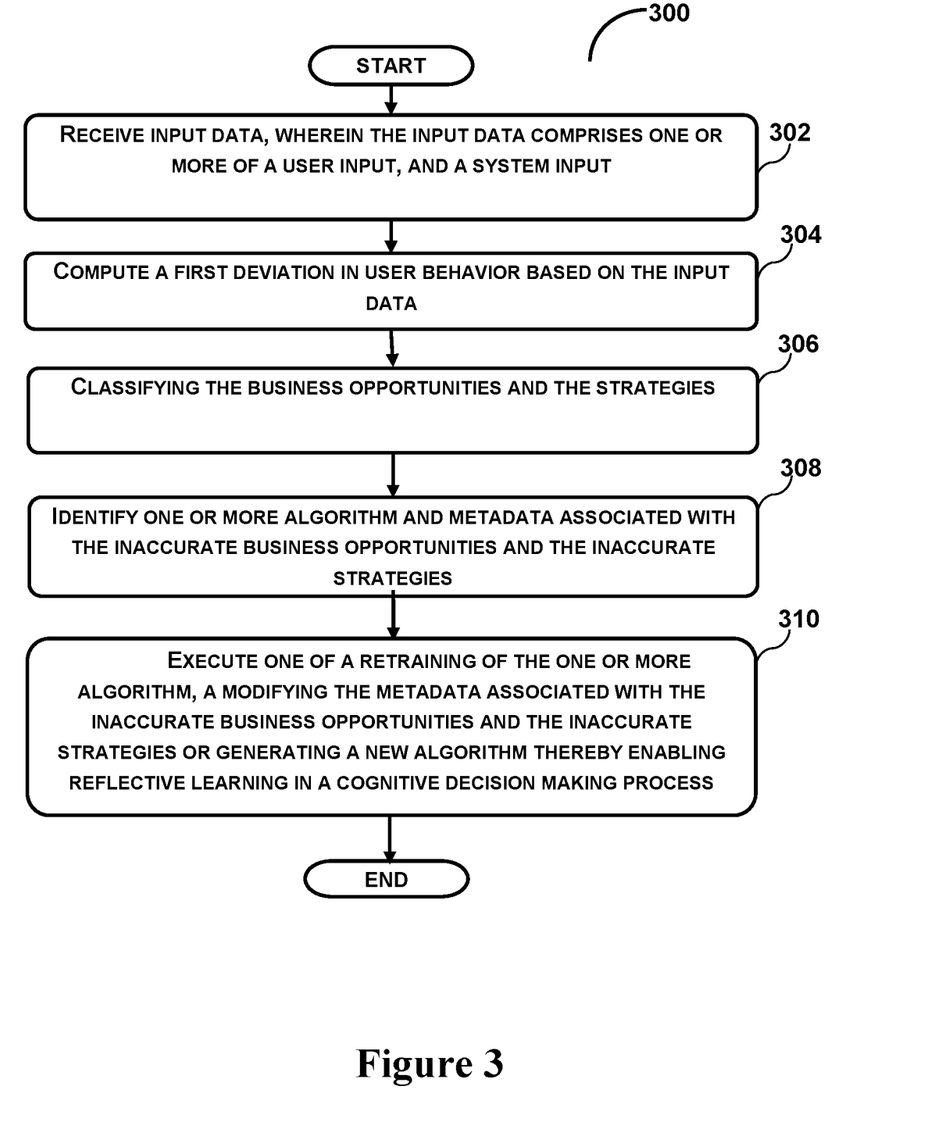
FIG. 3 illustrates a method for reflective learning in a cognitive decision-making process, in accordance with an embodiment of the present subject matter.

Referring now to FIG. 4, a method 300 for reflective learning in a cognitive decision-making process is disclosed in accordance with an embodiment of the present subject matter. The method 300 for reflective learning in a cognitive decision-making process may be described in the general context of device executable instructions. Generally, device executable instructions can include routines, programs, objects, components, data structures, procedures, modules, functions, and the like, that perform particular functions or implement particular abstract data types. The method 300 for reflective learning in a cognitive decision-making process may also be practiced in a distributed computing environment where functions are performed by remote processing systems that are linked through a communications network. In a distributed computing environment, computer executable instructions may be located in both local and remote computer storage media, including memory storage systems.

The order in which the method 300 for reflective learning in a cognitive decision-making process is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method 300 can be implemented in any suitable hardware, software, firmware, or combination thereof. However, for ease of explanation, in the embodiments described below, the method 300 for reflective learning in a cognitive decision-making process may be considered to be implemented in the above-described system 102.

At block, 302 input data may be revived. In one example, the input data may comprise one or more of a user input, and a system input. In one embodiment, the reflection module 212 may receive the input data. Further, the reflection module 212 may store the input data in the system data 218.

At block 304, a first deviation in user behaviour is computed based on the input data. In one example, the identification may be based on comparison of the user input indicative of user behaviour and an expected user behaviour. In one embodiment, the reflection module 212 may generate compute a first deviation in user behaviour. Further, the reflection module 212 may store a first deviation in user behaviour in the system data 218.

At block 306, the business opportunities and the strategies may be classified as one of accurate business opportunities or inaccurate business opportunities and accurate strategies or inaccurate strategies based on comparison of the first deviation with a predefined threshold. In one embodiment, the reflection module 212 may classify the business opportunities one of an accurate business opportunities or an inaccurate business opportunities and an accurate strategies or an inaccurate strategies. Further, the reflection module 212 may store the classification in the system data 218.

At block 308, one or more algorithm and metadata associated with the inaccurate business opportunities and the inaccurate strategies may be identified. In one embodiment, the learning module 214 may identify one or more algorithm and metadata associated with the inaccurate business opportunities and the inaccurate strategies. Further, the learning module 214 may store the inaccurate business opportunities and the inaccurate strategies in the system data 218.

At block 310, one of a retraining of the one or more inaccurate algorithm, a modifying the metadata associated with the inaccurate business opportunities and the inaccurate strategies or generating a new algorithm for replacing the inaccurate algorithm are executed thereby enabling reflective learning in a cognitive decision-making process, wherein the retraining is one of automatic or semi-automatic, or manual. In one embodiment, the learning module 214 may execute one of a retraining of the one or more inaccurate algorithm, a modifying the metadata associated with the inaccurate business opportunities and the inaccurate strategies or generating a new algorithm for replacing the inaccurate algorithm. Further, the learning module 214 may store update algorithm and metadata or new algorithm in the system data 218.

Although implementations for methods and systems for reflective learning in a cognitive decision-making process have been described in language specific to structural features and/or methods, it is to be understood that the appended claims are not necessarily limited to the specific features or methods for reflective learning in a cognitive decision-making process described. Rather, the specific features and methods are disclosed as examples of implementations for reflective learning in a cognitive decision-making process.

We claim:

1. A method for reflective learning in a cognitive decision-making process, the method comprising the steps of:
   receiving, by a processor, input data comprising one or more of a user input, and a system input, wherein the input data is associated with one or more opportunities from a set of opportunities, and a plurality of strategies associated with each of the one or more opportunities, and wherein the user input comprises one or more of an acceptance of one opportunity of the one or more opportunities, a rejection of the one opportunity, an amendment of the one opportunity, and no response on the one opportunity, an acceptance of one strategy of the plurality of strategies, a rejection of the one strategy, an amendment of the one strategy, and no response on the one strategy, and wherein the system data comprises computing load, activities logs, failure characteristics, and metadata associated with the one opportunity;
   generating, by the processor, an expected behaviour of the user based on historical data and an expectation threshold and ideal system data indicative of an ideal system behaviour, wherein the historical data comprises the activities logs;
   computing, by the processor, a first deviation in a user behaviour based on the user input, wherein the computation is based on comparison of the user input indicative of the user behaviour and the expected behaviour;
   computing, by the processor, a second deviation based on analysis of the system input and the ideal system data indicative of ideal working of the system;
   classifying, by the processor, the opportunities and the strategies as one of accurate opportunities or inaccurate opportunities and as accurate strategies or inaccurate strategies based on comparison of the first deviation and the second deviation with a predefined threshold;
   identifying, by the processor, one or more algorithms and metadata associated with the inaccurate opportunities and the inaccurate strategies;
   automatically updating, by the processor, the one or more algorithms and the metadata based on a modification of the metadata associated with the inaccurate opportunities and the inaccurate strategies;
   continuously evaluating, by the processor, an accuracy of the one or more algorithms by observing a shift in a nature of processes generating the input data, wherein the continuous evaluation is performed in a Distributed Computing Environment (DCE); and
   redeveloping, by the processor, the one or more algorithms when the accuracy drops below an acceptable threshold, thereby enabling reflective learning in a cognitive decision-making process, wherein the one or more algorithms are redeveloped either automatically or semi-automatically.

2. The method of claim 1, further comprising
   receiving, by the processor, the one or more opportunities and the one or more strategies; and
   prompting, by the processor, the user to provide the user input.

3. The method of claim 1, further comprises identifying, by the processor, the one opportunity based on an analysis of a real time incoming data based on one or more pattern recognition algorithms.

4. A system for reflective learning in a cognitive decision-making process, the system comprising:
   a memory; and
   a processor coupled to the memory, wherein the processor is configured to:
   receive input data wherein the input data comprises one or more of a user input, and a system input, wherein the input data is associated with one or more opportunities from a set of opportunities, and a plurality of strategies associated with each of the one or more opportunities, and wherein the user input comprises one or more of an acceptance of one opportunity of the one or more opportunities, a rejection of the one opportunity, an amendment of the one opportunity, and no response on the one opportunity, an acceptance of one strategy of the plurality of strategies, a rejection of the one strategy, an amendment of the one strategy, and no response on the one strategy, and wherein the system data comprises computing load, activities logs, failure characteristics, and metadata associated with the one opportunity;
   generate an expected behaviour of the user based on historical data and an expectation threshold and ideal system data indicative of an ideal system behaviour, wherein the historical data comprises the activities logs;
   compute a first deviation in a user behaviour based on the user input, wherein the computation is based on comparison of the user input indicative of the user behaviour and the expected behaviour;
   compute a second deviation based on analysis of the system input and the ideal system data indicative of ideal working of the system;
   classify the opportunities and the strategies as one of accurate opportunities or inaccurate opportunities and as accurate strategies or inaccurate strategies based on comparison of the first deviation and the second deviation with a predefined threshold;
   identify one or more algorithms and metadata associated with the inaccurate opportunities and the inaccurate strategies;
   automatically update the one or more algorithms and the metadata based on a modification of the metadata associated with the inaccurate opportunities and the inaccurate strategies;
   continuously evaluate an accuracy of the one or more algorithms by observing a shift in a nature of processes generating the input data, wherein the continuous evaluation is performed in a Distributed Computing Environment (DCE); and
   redevelop the one or more algorithms when the accuracy drops below an acceptable threshold, thereby enabling reflective learning in a cognitive decision-making process, wherein the one or more algorithms are redeveloped either automatically or semi-automatically.

5. The system of claim 4, wherein the processor is configured to receive the one or more opportunities and the one or more strategies; and prompt the user to provide the user input.

6. The system of claim 4, wherein the processor is configured to identify the one opportunity based on an analysis of a real time incoming data based on one or more pattern recognition algorithms.

7. A non-transitory computer readable medium embodying a program executable in a computing device for reflective learning in a cognitive decision-making process, the program comprising a program code for:

receiving input data, wherein the input data comprises one or more of a user input, and a system input, wherein the input data is associated with one or more opportunities from a set of opportunities, and a plurality of strategies associated with each of the one or more opportunities, and wherein the user input comprises one or more of an acceptance of one opportunity of the one or more opportunities, a rejection of the one opportunity, an amendment of the one opportunity, and no response on the one opportunity, an acceptance of one strategy of the plurality of strategies, a rejection of the one strategy, an amendment of the one strategy, and no response on the one strategy, and wherein the system data comprises computing load, activities logs, failure characteristics, and metadata associated with the one opportunity;

generating an expected behaviour of the user based on historical data and an expectation threshold and ideal system data indicative of an ideal system behaviour, wherein the historical data comprises the activities logs;

computing a first deviation in a user behaviour based on the user input, wherein the computation is based on comparison of the user input indicative of the user behaviour and the expected behaviour;

computing a second deviation based on analysis of the system input and the ideal system data indicative of ideal working of the system;

classifying the opportunities and the strategies as one of accurate opportunities or inaccurate opportunities and as accurate strategies or inaccurate strategies based on comparison of the first deviation and the second deviation with a predefined threshold;

identifying one or more algorithms and metadata associated with the inaccurate opportunities and the inaccurate strategies;

automatically updating the one or more algorithms and the metadata based on a modification of the metadata associated with the inaccurate opportunities and the inaccurate strategies;

continuously evaluating an accuracy of the one or more algorithms by observing a shift in a nature of processes generating the input data, wherein the continuous evaluation is performed in a Distributed Computing Environment (DCE); and redeveloping the one or more algorithms when the accuracy drops below an acceptable threshold, thereby enabling reflective learning in a cognitive decision-making process, wherein the one or more algorithms are redeveloped either automatically or semi-automatically.

8. The non-transitory computer readable medium of claim 7 further comprises receiving the one or more opportunities and the one or more strategies;
and prompting the user to provide the user input.

9. The non-transitory computer readable medium of claim 7, further comprises identifying the one opportunity based on an analysis of a real time incoming data based on one or more pattern recognition algorithms.

* * * * *